United States Patent

Mack

[15] 3,681,648

[45] Aug. 1, 1972

[54] CIRCUIT ARRANGEMENT FOR ADDING TWO SIGNALS IN EXACT MUTUAL PHASE POSITION

[72] Inventor: Zdenek Mack, Prague, Czechoslovakia

[73] Assignee: TESLA, narodni Podnik, Prague, Czechoslovakia

[22] Filed: June 12, 1969

[21] Appl. No.: 832,689

[52] U.S. Cl. ....................315/23, 315/24, 179/15 BC

[51] Int. Cl. ..............................................H01j 29/70

[58] Field of Search ..315/23, 24, 156; 328/133, 231; 179/15 R, 15 BC

[56] References Cited

UNITED STATES PATENTS 2,464,558 3/1949 Dammers........................315/24

*Primary Examiner*—Benjamin R. Padgett
*Assistant Examiner*—J. M. Potenza
*Attorney*—Richard Low

[57] ABSTRACT

A first signal is supplied to a first resonance amplifier and the second harmonic of the first signal is supplied to a second resonance amplifier. The first resonance amplifier is coupled to the vertical deflection plate system of a cathode ray oscilloscope and to an input of a summing device. The second resonance amplifier is coupled to the horizontal deflection plate system of the oscilloscope and to another input of the summing device.

10 Claims, 10 Drawing Figures

INVENTOR.
Zdeněk Mack
BY Richard ...
Atty

INVENTOR.
Zdeněk Mack
BY
Ag't

INVENTOR.
Zdeněk Mack

BY [illegible] Agt

INVENTOR.
Zdeněk Mack
BY
[signature] Agt

INVENTOR.
Zdeněk Mack
BY Richard Low Agt

CIRCUIT ARRANGEMENT FOR ADDING TWO SIGNALS IN EXACT MUTUAL PHASE POSITION

DESCRIPTION OF THE INVENTION

The present invention relates to a circuit arrangement for adding two signals in exact mutual phase position. More particularly, the invention relates to a circuit arrangement for adding a lower frequency signal to a higher frequency signal in exact mutual phase position, the higher frequency signal being the second harmonic of the lower frequency signal.

In the transmission of signals via an amplitude-modulated wave, when the carrier wave itself is completely suppressed, either a harmonic or sub-harmonic signal of the carrier wave is transmitted for the purpose of demodulation at the receiver. The transmitted signal may thus be either twice the frequency of the carrier wave or half said frequency, for example. The harmonic or sub-harmonic component of the carrier wave aids in reconstituting said carrier wave at the receiver. The reconstituted carrier wave controls the operation of the synchronous demodulator of the receiver.

In order that the transmitted modulating signal be received at the receiver without distortion, the reconstituted carrier wave at the receiver must have a specific defined phase. The phase is, of course, dependent upon the phase of the transmitted harmonic or sub-harmonic component. The harmonic or sub-harmonic component must therefore be transmitted with an exactly defined phase. This type of transmission is utilized in high frequency stereophonic broadcasting-transmission, for example. In this type of transmission, acoustic or audio signals are transmitted in a manner whereby the left signal and the right signal are mutually added and subtracted.

The sum frequency is transmitted in the audio or acoustic band at, for example, 30 Hertz to 15 kilohertz. The difference frequency is modulated on a sub-carrier wave having a frequency of, for example, 38 kilohertz. The sub-carrier wave itself is suppressed, so that only the sidebands are transmitted. The sub-harmonic component of the sub-carrier wave, which is called the pilot signal, is transmitted. The frequency of the pilot signal is half that of the sub-carrier wave, or 19 kilohertz.

At the receiver, the pilot signal is amplified and its frequency is doubled. In this manner, the sub-carrier wave is reconstituted, and the reconstituted sub-carrier wave is utilized to modulate both sidebands. The difference stereophonic signal is provided by the modulated sidebands.

The predetermined phase of the pilot signal is defined as follows in stereophonic transmission. The sub-carrier wave simultaneously passes through zero potential at the same point as the pilot signal. Each of the pilot signal and the sub-carrier wave is first derived at such point.

In order to prevent distortion of the transmitted modulated signal, the reconstituted sub-carrier wave must have a predetermined tolerance with regard to both sidebands. The predetermined tolerance is less than ±3°. For measuring purposes, the predetermined tolerance is less than ±1°. If the phase of the reconstituted carrier wave deviates beyond the prescribed limits, cross talk and non-linear distortion occurs between channels.

There are two types of adjustment or control of the phase of the pilot signal relative to the sub-carrier wave to provide the proper or correct phase. In one control system the stereophonic signal is supplied to an oscilloscope and the phase is adjusted by means of the traces produced on the screen. In the other control system, a calibrating generator is utilized.

The system which utilizes an oscilloscope requires the services of a trained expert to operate the exact broadband oscilloscope, since the adjustment of the phase by means of the traces on the screen is very exacting. Furthermore, it is impossible to check the phase during the broadcast transmission. These disadvantages of the system utilizing an oscilloscope make the system utilizing a calibrating generator the preferred system.

In the system which utilizes a calibrating generator, the calibrating generator supplies the pilot signal and the sub-carrier wave in the predetermined phase. It permits an exact adjustment of the measuring decoder, which permits the adjustment of the transmitter and, if desired, the adjustment of the other sources of the stereophonic signal.

The principal object of the present invention is to provide a new and improved circuit arrangement for adding two signals in exact mutual phase position.

An object of the present invention is to provide a new and improved calibrating generator.

An object of the present invention is to provide a circuit arrangement for adding harmonic signals in exact mutual phase position.

An object of the present invention is to provide a circuit arrangement for adding two signals in exact mutual phase position with an accuracy of less than ±1°.

An object of the present invention is to provide a circuit arrangement for adding two signals in exact mutual phase position to control and adjust stereophonic broadcasting transmission.

An object of the present invention is to provide a circuit arrangement for adding two signals in exact mutual phase position with an accuracy to less than ±0.5°.

An object of the present invention is to provide a circuit arrangement for adding two signals in exact mutual phase position, which circuit arrangement is of simple structure and operates with efficiency, accuracy, effectiveness and reliability.

In accordance with the present invention, a circuit arrangement for adding two signals in exact mutual phase position comprises a frequency varying circuit having first and second outputs for providing from a single signal a first signal having a specific frequency and a second signal which is the second harmonic of the first signal and has a frequency higher than the specific frequency. A first coupling couples the first output of the frequency varying circuit to the input of a first resonance amplifier. A second coupling couples the second output of the frequency varying circuit to the input of a second resonance amplifier. A cathode ray oscilloscope has a horizontal deflection plate system for deflecting an electron beam therein horizontally and a vertical deflection plate system for deflecting the electron beam vertically. A summing device has first and second inputs and an output and adds signals supplied to its inputs and provides the resultant sum at its input. A first additional coupling couples the output of the first resonance amplifier to one of the deflection plate systems of the oscilloscope and to the first input of the summing device. A second additional coupling couples the output of the second resonance amplifier to the other of the deflection plate systems of the oscilloscope and to the second input of the summing device.

The frequency varying circuit may comprise a wave generator for producing a wave and a frequency multiplier for multiplying the frequency of the wave. The frequency varying circuit may comprise a wave generator for producing a wave and a frequency divider for dividing the frequency of the wave.

The first coupling comprises a phase shifting circuit. The second coupling comprises a phase inverter having an input connected to the second output of the frequency varying circuit and a pair of outputs. A balanced modulator has a pair of inputs connected to the outputs of the phase inverter, a third input and an output connected to the input of the second resonance amplifier. A generator produces a periodic control wave and has an output connected to the third input of the balanced modulator.

The first additional coupling comprises a first resonance circuit coupled between said first resonance amplifier and the one of said deflection plate systems and a first voltage divider connected between the first resonance circuit and the first input of the summing device. The second additional coupling comprises a second resonance circuit coupled between the second resonance amplifier and the other of the deflection plate systems and a second voltage divider connected between the second resonance circuit and the second input of the summing device.

In order that the present invention may be readily carried into effect, it will now be described with reference to the accompanying drawings, wherein.

Figure 1:
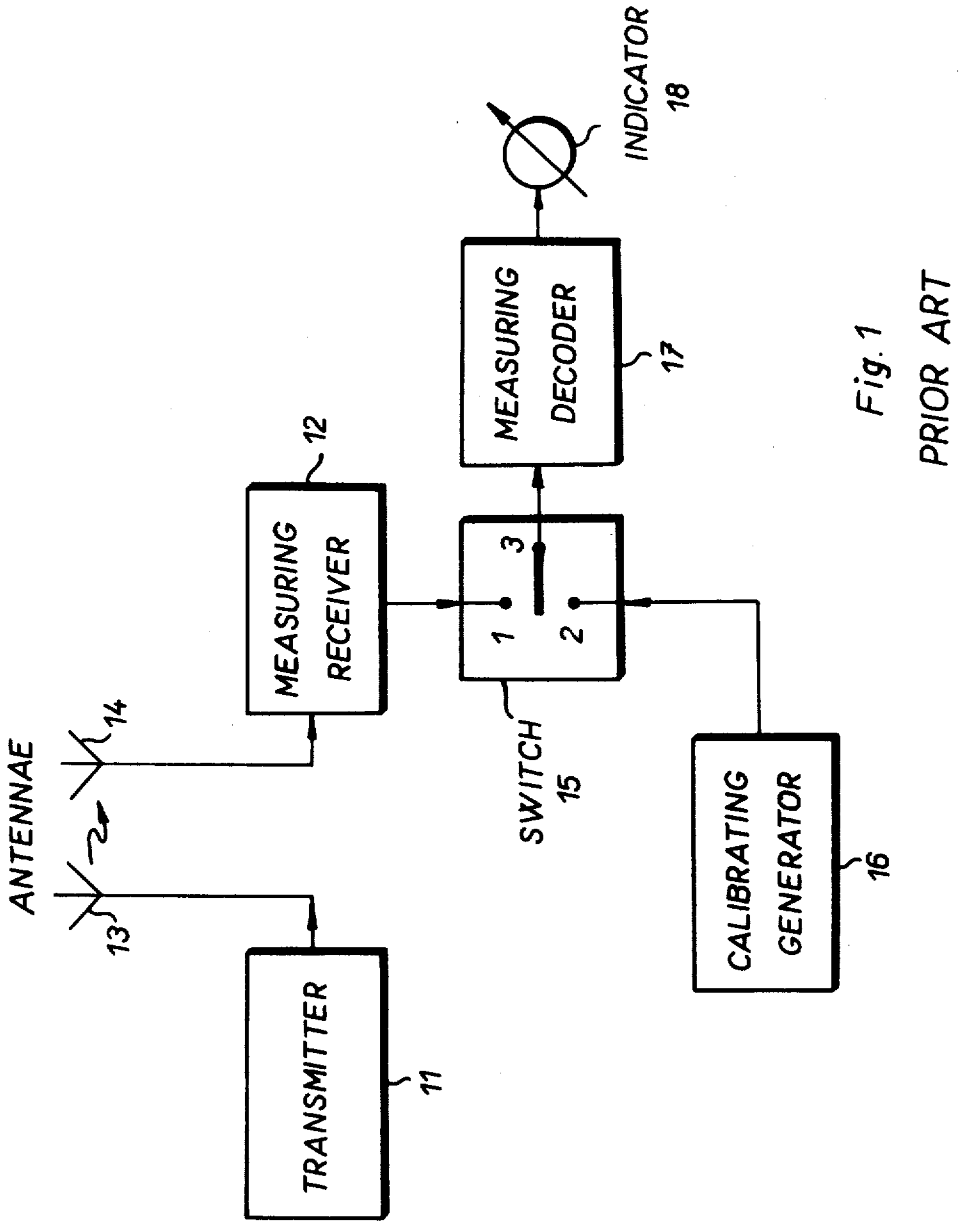
Fig. 1 PRIOR ART
FIG. 1 is a block diagram of an embodiment of a system of known type utilizing a calibrating generator for phase adjustment.

In FIG. 1, a transmitter 11 transmits signals to a measuring receiver 12 via a transmitter antenna 13 and a receiver antenna 14. The output of the receiver 12 is connected to one contact 1 of a switch 15. A calibrating generator 16 is connected to a second contact 2 of the switch 15. The output or contact arm 3 of the switch 15 is connected to the input of a measuring decoder 17.

To adjust or check the transmitter, the measuring decoder 17 is first connected to the output of the calibrating generator 16 via the contract 2 and the contact arm 3 of the switch 15. The measuring decoder 17 is then exactly adjusted.

After the measuring decoder 17 is adjusted, it is switched over to the output of the measuring receiver 12 via the contact 1 and the contact arm 3 of the switch 15. The phase of the transmitter pilot signal varies until the measuring decoder 17 is adjusted at zero deflection of an indicator 18 for cross talk, as when said measuring decoder is switched over to the calibrating generator 16. The indicator 18 is connected to the measuring decoder 17.

The accuracy of the phase adjustment in the system of FIG. 1 is obviously dependent upon the accuracy of the calibrating generator 16. The accuracy and stability requirements of the calibrating generator 16 are thus very severe. The properties of the calibrating generator 16 must be considerably more suitable than those of the transmitter.

Figure 2:
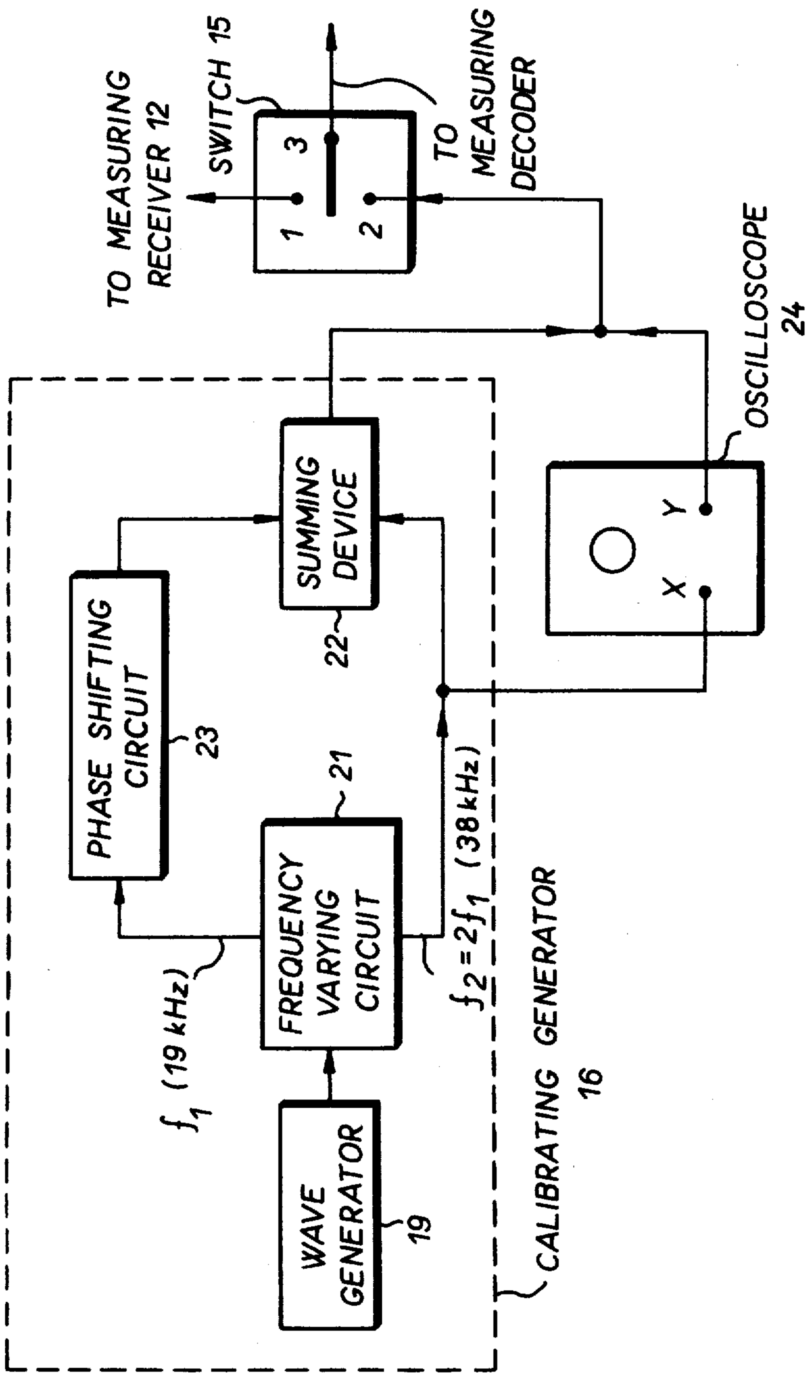
Fig. 2 PRIOR ART
FIG. 2 is a block diagram of an embodiment of the calibrating generator of the system of FIG. 1.

FIG. 2 illustrates a known circuit arrangement of a calibrating generator which may be utilized as the calibrating generator 16 of FIG. 1. A wave generator 19 provides a basic wave, which is varied in frequency to a sub-harmonic and a second harmonic of said basic wave by a frequency varying circuit 21. The frequency varying circuit 21 comprises a frequency divider for producing the sub-harmonic wave and a frequency multiplier for producing the second harmonic wave.

The basic wave or its sub-harmonic, having a frequency $f_1$, 19 kilohertz, for example, is supplied to a summing device 22 via a phase shifting circuit 23. The second harmonic or the basic wave, having a frequency $f_2$, of 38 kilohertz, which is twice the frequency $f_1$, is supplied to the summing device 22. The summing device 22 adds the two frequency components and provides the resultant sum at its output, which is connected to the contact 2 of the switch 15.

In order to attain the desired accuracy or exactness and stability of the calibrating generator 16, an accurate oscilloscope 24 must be utilized. The oscilloscope 24 is connected between a common point in the connection between the frequency varying circuit 21 and the summing device 22 and the output of said summing device. The oscilloscope 24 adjusts and checks the mutual phase shift of the signals in the calibrating generator 16.

A disadvantage of the circuit arrangement of FIG. 2 is that the oscilloscope 24 must be periodically checked with very great accuracy in order to insure accuracy of said oscilloscope in checking the amplitude and phase of the signals. The oscilloscope 24 and the necessity for frequently checking it and the calibrating generator result in more expensive operation of the circuit arrangement (FIG. 2) than would otherwise be the case. As hereinbefore stated, these operations are properly undertaken by an expert technician only. Aside from this, however, the phase adjustment produces signals of undesired frequency, if said phase adjustment is greater than the 1° limitation.

Figure 3A:
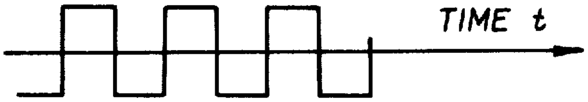
FIG. 3 is a series of graphical presentations illustrating waveforms appearing in the calibrating generator of FIG. 2.
Figure 3B:
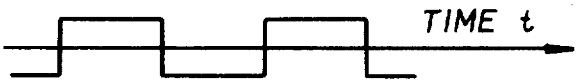
Figure 3C:
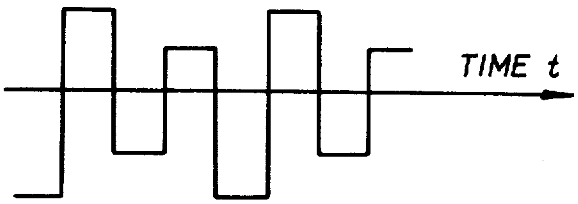

In another known circuit arrangement for a calibrating generator, similar to FIG. 2, the signals provided are rectangular wave signals. One wave, having a frequency $f_2$, is shown in curve A of FIG. 3. The other wave, having a frequency $f_1$, which is half the frequency $f_2$, is shown in curve B of FIG. 3. The resultant sum of curves A and B is shown in curve C of FIG. 3, which resultant sum is a rectangular wave indicating the desired output signal.

The rectangular wave circuit arrangement for a calibrating generator utilizes flip flop circuits or bistable multivibrators, in which there is only a small change in phase at the leading and trailing edges of the rectangular wave. A disadvantage of this circuit arrangement is the requirement for an accurate oscilloscope and an expert technician for suitable adjustment and checking. Furthermore, there is a possibility that the higher harmonic components, which are provided as rectangular waves, may distort each other in the measuring decoder.

It is thus seen that the known circuit arrangements for calibrating generators cannot insure a phase deviation of the two frequency components within the tolerance of ±5° unless they utilize an expensive oscilloscope, an expert technician and periodic checking. Such circuit arrangements cannot prevent the occurrence of undesired frequencies, either.

Figure 4:
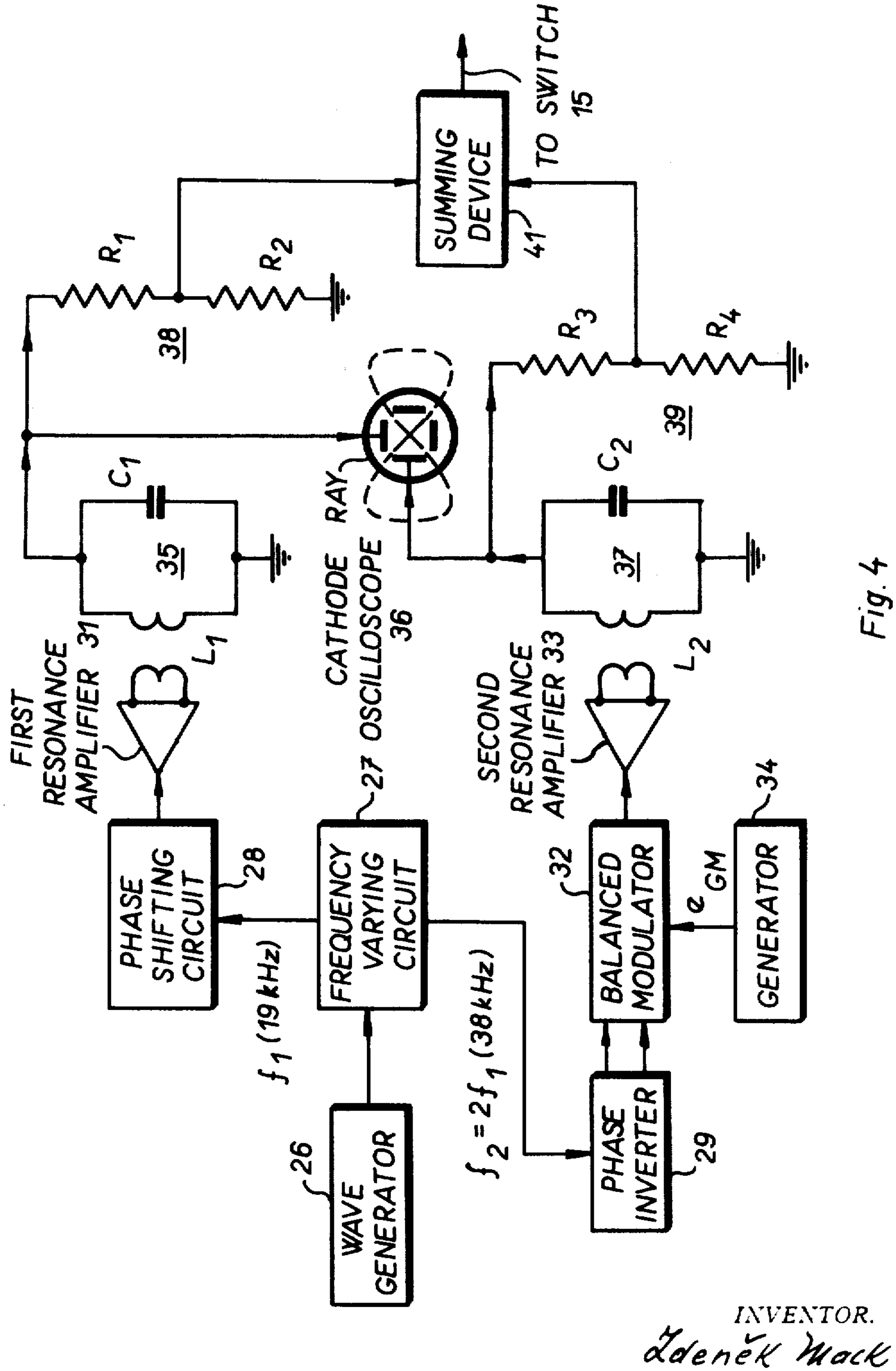
FIG. 4 is a block and circuit diagram of an embodiment of the calibrating generator circuit arrangement of the present invention.

FIG. 4 is a circuit and block diagram of the circuit arrangement of the present invention for a calibrating generator. The calibrating generator of FIG. 4 functions to add together two harmonic frequency components, the higher frequency component being the harmonic of the lower frequency component, at an accuracy of phase alignment of closer than ±0.5°.

In FIG. 4, the basic wave is provided by a wave generator 26 and is supplied to the input of a frequency varying circuit 27. The frequency varying circuit 27 comprises a frequency divider for producing the sub-harmonic wave and a frequency multiplier for producing the second harmonic wave. The basic wave or its sub-harmonic, having a frequency $f_1$, of 19 kilohertz, for example, is supplied to the input of a phase shifting circuit 28. The second harmonic or the basic wave, having a frequency $f_2$, of 38 kilohertz, is supplied to the input of a phase inverter 29.

The output of the phase shifting circuit 28 is connected to the input of a first resonance amplifier 31. The outputs of the phase inverter 29 are connected to inputs of a balanced modulator 32. The output of the balanced modulator 32 is connected to the input of a second resonance amplifier 33. A generator 34 is connected to another input of the balanced modulator 32. The generator 34 produces a periodic wave having a frequency many times smaller than the basic wave produced by the wave generator 26.

A first resonance circuit 35 is coupled to the output of the first resonance amplifier 31. The first resonance circuit 35 comprises an inductor $L_1$ and a capacitor $C_1$. The first resonance circuit 35 is connected in common to the vertical deflection plate system of a cathode ray oscilloscope 36 and to a first voltage divider 38.

A second resonance circuit 37 is coupled to the output of the second resonance amplifier 33. The second resonance circuit 37 comprises an inductor $L_2$ and a capacitor $C_2$. The second resonance circuit 37 is connected in common to the horizontal deflection plate system of the cathode ray oscilloscope 36 and to a second voltage divider 39.

The first voltage divider 38 comprises a pair of resistors $R_1$ and $R_2$. The second voltage divider 39 comprises a pair of resistors $R_3$ and $R_4$. The midpoint of the first voltage divider 38, at a common point in the connection between the resistors $R_1$ and $R_2$, is connected to an input of a summing device 41. The midpoint of the second voltage divider 39, at a common point in the connection between the resistors $R_3$ and $R_4$, is connected to another input of the summing device 41.

The generator 34 supplies a control signal to the balanced modulator 32. The voltages supplied to the deflection plate systems of the cathode ray oscilloscope 36 are so high in magnitude, that only part of the Lissajous figures appear on the screen of said oscilloscope. Lissajous figures are a family of plane curves described by a point having two simple harmonic motions at right angles, various phase relations and integral frequency ratios. Lissajous figures are utilized for frequency comparison by means of cathode ray oscilloscopes.

The signals having a frequency $f_2$ produced by the frequency varying circuit 27 are the second harmonic of the signals having a frequency $f_1$ produced by said frequency varying circuit. The AC voltage at the first resonant circuit 35 is several times greater than that necessary for deviation of the cathode ray or electron beam in the oscilloscope 36 to the limits of the screen of said oscilloscope.

The first and second resonance amplifiers 31 and 33 permit the attainment of the necessary amplification with facility and simultaneously suppress undesired frequency components. The first and second voltage dividers 38 and 39 reduce the magnitude of the voltage several times relative to the voltage at the first and second resonant circuit 35 and 37, respectively.

The phase inverter 29 converts the second harmonic signal produced by the frequency varying circuit 27 into two signals shifted 180° in phase from each other. The balanced modulator 32 functions as a phase switch under the control of the signals provided by the generator 34. The generator 34 provides a signal which is either a harmonic or a rectangular wave.

Figure 5A:
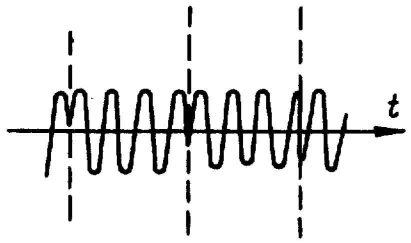
FIGS. 5a and 5b are graphical presentations illustrating waveforms appearing in the circuit arrangement of FIG. 4.
Figure 5B:
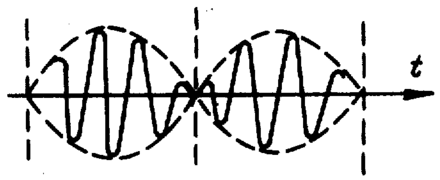

The balanced modulator 32 operates in a manner whereby when a positive half wave control voltage is applied to said modulator by the generator 34, a signal, having the opposite phase from that of the signal provided when said generator applies a negative half wave control voltage to said modulator, is provided at the output of said modulator. FIG. 5a shows the output signal of the balanced modulator 32 when the generator 34 applies a rectangular wave to said modulator. FIG. 5b shows the output signal of the balanced modulator 32 when the generator 34 applies a harmonic wave to said modulator.

The output signal of the balanced modulator 32 is supplied to the second resonance amplifier 33, which amplifies said signal to the extent that the AC voltage at the second resonant circuit 37 is several times greater than that necessary for deviation of the cathode ray or electron beam in the oscilloscope 36 to the limits of the screen of said oscilloscope.

Figure 6A:
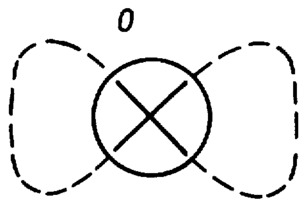
FIGS. 6*a* and 6*b* illustrate Lissajous figures appearing on the screen of the cathode ray oscilloscope of FIG. 4.
Figure 6B:
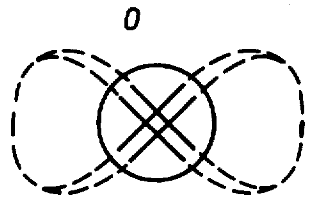

The Lissajous figures are provided on the screen of the oscilloscope 36 as the center portion of a Figure Eight lying on its side, as shown in FIGS. 6a and 6b. Due to the great magnitude of the voltages at the first and second resonance circuits, only the center portion of the Lissajous figures, comprising cross-lines in X configuration, appears on the screen of the oscilloscope 36.

When the waves having the frequencies $f_1$ and $f_2$ are exactly in phase with each other, the crossed lines shown in FIG. 6a appear on the screen of the oscilloscope 36, although the phase of the waves may be varied 180°. When the waves are not exactly in phase, the double crossed lines shown in FIG. *6b* appear on the screen of the oscilloscope 36.

The circuit arrangement of the present invention utilizes the resonance amplifiers 31 and 33 instead of the broadband amplifiers utilized in the circuit arrangements of known type. The resonance amplifiers are of simpler structure than the broadband amplifiers and suppress undesirable frequencies, and therefore constitute an advantage of the circuit arrangement of the present invention. The advantage of using the resonance amplifiers is acquired without difficulty and provides very suitable Lissajous figures without difficulty.

In the circuit arrangement of the present invention, the output signal is derived directly from the signals applied to the deflection plates of the oscilloscope. This prevents uncontrollable phase shift between the Lissajous figure on the oscilloscope screen and the output signal supplied by the summing device 41. The known circuit arrangements are unable to insure such a result, so that erroneous adjustment follows if there is a phase error in an amplifier feeding the oscilloscope in a known circuit arrangement. The provision of Lissajous pictures of considerable magnitude in the circuit arrangement of the present invention, insures an accurate adjustment of the phase.

Each of the component blocks 26 to 29, 31 to 34 and 41 comprises a circuit well known in the art and the oscilloscope 36 of FIG. 4 comprises a unit well known in the art.

While the invention has been described by means of a specific example and in a specific embodiment, we do not wish to be limited thereto, for obvious modifications will occur to those skilled in the art without departing from the spirit and scope of the invention.

What we claim is:

1. A circuit arrangement for adding two signals in exact mutual phase position, said circuit arrangement comprising frequency varying circuit means having first and second outputs for providing from a single signal a first signal having a specific frequency and a second signal which is the second harmonic of said first signal and has a frequency higher than said specific frequency;

a first resonance amplifier having an input and an output;

first coupling means coupling the first output of said frequency varying circuit means to the input of said first resonance amplifier;

a second resonance amplifier having an input and an output;

second coupling means coupling the second output of said frequency varying circuit means to the input of said second resonance amplifier;

a cathode ray oscilloscope having a horizontal deflection plate system for deflecting an electron beam therein horizontally and a vertical deflection plate system for deflecting said electron beam vertically;

summing means having first and second inputs and an output for adding signals supplied to its inputs and providing the resultant sum at its output;

first additional coupling means coupling the output of said first resonance amplifier to one of the deflection plate systems of said oscilloscope and to the first input of said summing means; and second additional coupling means coupling the output of said second resonance amplifier to the other of the deflection plate systems of said oscilloscope and to the second input of said summing means.

2. A circuit arrangement as claimed in claim 1, wherein said frequency varying circuit means comprises a wave generator for producing a wave and a frequency multiplier for multiplying the frequency of said wave.

3. A circuit arrangement as claimed in claim 1, wherein said first coupling means comprises a phase shifting circuit.

4. A circuit arrangement for adding two signals in exact mutual phase position, said circuit arrangement comprising frequency varying circuit means comprising a wave generator for producing a wave and a frequency divider for dividing the frequency of said wave and having first and second outputs for providing from a single signal a first signal having a specific frequency and a second signal which is the second harmonic of said first signal and has a frequency higher than said specific frequency;

a first resonance amplifier having an input and an output;

first coupling means coupling the first output of said frequency varying circuit means to the input of said first resonance amplifier;

a second resonance amplifier having an input and an output;

second coupling means coupling the second output of said frequency varying circuit means to the input of said second resonance amplifier;

a cathode ray oscilloscope having a horizontal deflection plate system for deflecting an electron beam therein horizontally and a vertical deflection plate system for deflecting said electron beam vertically;

summing means having first and second inputs and an output for adding signals supplied to its inputs and providing the resultant sum at its output;

first additional coupling means coupling the output of said first resonance amplifier to one of the deflection plate systems of said oscilloscope and to the first input of said summing means; and second additional coupling means coupling the output of said second resonance amplifier to the other of the deflection plate systems of said oscilloscope and to the second input of said summing means.

5. A circuit arrangement for adding two signals in exact mutual phase position, said circuit arrangement comprising frequency varying circuit means having first and second outputs for providing from a single signal a first signal having a specific frequency and a second signal which is the second harmonic of said first signal and has a frequency higher than said specific frequency;

a first resonance amplifier having an input and an output;

first coupling means coupling the first output of said frequency varying circuit means to the input of said first resonance amplifier;

a second resonance amplifier having an input and and output;

second coupling means comprising a phase inverter having an input connected to the second output of said frequency varying circuit means and a pair of outputs, a balanced modulator having a pair of inputs connected to the outputs of said phase inverter, a third input and an output connected to the input of said second resonance amplifier, and a generator for producing a period control wave having an output connected to the third input of said balanced modulator and coupling the second output of said frequency varying circuit means to the input of said second resonance amplifier;

a cathode ray oscilloscope having a horizontal deflection plate system for deflecting an electron beam therein horizontally and a vertical deflection plate system for deflecting said electron beam vertically;

summing means having first and second inputs and an output for adding signals supplied to its inputs and providing the resultant sum at its output;

first additional coupling means coupling the output of said first resonance amplifier to one of the deflection plate systems of said oscilloscope and to the first input of said summing means; and second additional coupling means coupling the output of said second resonance amplifier to the other of the deflection plate systems of said oscilloscope and to the second input of said summing means.

6. A circuit arrangement for adding two signals in exact mutual phase position, said circuit arrangement comprising frequency varying circuit means having first and second outputs for providing from a single signal a first signal having a specific frequency and a second signal which is the second harmonic of said first signal and has a frequency higher than said specific frequency;

a first resonance amplifier having an input and an output;

first coupling means coupling the first output of said frequency varying circuit means to the input of said first resonance amplifier;

a second resonance amplifier having an input and an output;

second coupling means coupling the second output of said frequency varying circuit means to the input of said second resonance amplifier;

a cathode ray oscilloscope having a horizontal deflection plate system for deflecting an electron beam therein horizontally and a vertical deflection plate system for deflecting said electron beam vertically;

summing means having first and second inputs and an output for adding signals supplied to its inputs and providing the resultant sum at its output;

first additional coupling means comprising a first resonance circuit coupled between said first resonance amplifier and said one of said deflection plate systems and a first voltage divider connected between said first resonance circuit and the first input of said summing means and coupling the output of said first resonance amplifier to one of the deflection plate systems of said oscilloscope and to the first input of said summing means; and second additional coupling means coupling the output of said second resonance amplifier to the other of the deflection plate systems of said oscilloscope and to the second input of said summing means.

7. A circuit arrangement for adding two signals in exact mutual phase position, said circuit arrangement comprising frequency varying circuit means having first and second outputs for providing from a single signal a first signal having a specific frequency and a second signal which is the second harmonic of said first signal and has a frequency higher than said specific frequency;

a first resonance amplifier having an input and an output;

first coupling means coupling the first output of said frequency varying circuit means to the input of said first resonance amplifier;

a second resonance amplifier having an input and and output;

second coupling means coupling the second output of said frequency varying circuit means to the input of said second resonance amplifier;

a cathode ray oscilloscope having a horizontal deflection plate system for deflecting an electron beam therein horizontally and a vertical deflection plate system for deflecting said electron beam vertically;

summing means having first and second inputs and an output for adding signals supplied to its inputs and providing the resultant sum at its output;

a first additional coupling means coupling the output of said first resonance amplifier to one of the deflection plate systems of said oscilloscope and to the first input of said summing means; and second additional coupling means comprising a second resonance circuit coupled between said second resonance amplifier and said other of said deflection plate systems and a second voltage divider connected between said second resonance circuit and the second input of said summing means and coupling the output of said second resonance amplifier to the other of the deflection plate systems of said oscilloscope and to the second input of said summing means.

8. A circuit arrangement for adding two signals in exact mutual phase position, said circuit arrangement comprising frequency varying circuit means having first and second outputs for providing from a single signal a first signal having a specific frequency and a second signal which is the second harmonic of said first signal and has a frequency higher than said specific frequency;

a first resonance amplifier having an input and and output;

first coupling means comprising a phase shifting circuit and coupling the first output of said frequency varying circuit means to the input of said first resonance amplifier;

a second resonance amplifier having an input and an output;

second coupling means comprising a phase inverter having an input connected to the second output of said frequency varying circuit means and a pair of outputs, a balanced modulator having a pair of inputs connected to the outputs of said phase inverter, a third input and an output connected to the input of said second resonance amplifier, and a generator for producing a periodic control wave having an output connected to the third input of said balanced modulator and coupling the second output of said frequency varying circuit means to the input of said second resonance amplifier;

a cathode ray oscilloscope having a horizontal deflection plate system for deflecting an electron beam therein horizontally and a vertical deflection plate system for deflecting said electron beam vertically;

summing means having first and second inputs and an output for adding signals supplied to its inputs and providing the resultant sum at its output;

first additional coupling means coupling the output of said first resonance amplifier to one of the deflection plate systems of said oscilloscope and to the first input of said summing means; and second additional coupling means coupling the output of said second resonance amplifier to the other of the deflection plate systems of said oscilloscope and to the second input of said summing means.

9. A circuit arrangement for adding two signals in exact mutual phase position, said circuit arrangement comprising frequency varying circuit means having first and second outputs for providing from a single signal a first signal having a specific frequency and a second signal which is the second harmonic of said first signal and has a frequency higher than said specific frequency;

a first resonance amplifier having an input and and output;

first coupling means coupling the first output of said frequency varying circuit means to the input of said first resonance amplifier;

a second resonance amplifier having an input and an output;

second coupling means coupling the second output of said frequency varying circuit means to the input of said second resonance amplifier;

a cathode ray oscilloscope having a horizontal deflection plate system for deflecting an electron beam therein horizontally and a vertical deflection plate system for deflecting said electron beam vertically;

summing means having first and second inputs and an output for adding signals supplied to its inputs and providing the resultant sum at its output;

first additional coupling means comprising a first resonance circuit coupled between said first resonance amplifier and said one of said deflection plate systems and a first voltage divider connected between said first resonance circuit and the first input of said summing means and coupling the output of said first resonance amplifier to one of the deflection plate systems of said oscilloscope and to the first input of said summing means; and second additional coupling means comprising a second resonance circuit coupled between said second resonance amplifier and said other of said deflection plate systems and a second voltage divider connected between said second resonance circuit and the second input of said summings and coupling the output of said second resonance amplifier to the other of the deflection plate systems of said oscilloscope and to the second input of said summing means.

10. A circuit arrangement for adding two signals in exact mutual phase position, said circuit arrangement comprising frequency varying circuit means having first and second outputs for providing from a single signal a first signal having a specific frequency and a second signal which is the second harmonic of said first signal and has a frequency higher than said specific frequency;

a first resonance amplifier having an input and an output;

first coupling means comprising a phase shifting circuit and coupling the first output of said frequency varying circuit means to the input of said first resonance amplifier;

a second resonance amplifier having an input and an output;

second coupling means comprising a phase inverter having an input connected to the second output of said frequency varying circuit means and a pair of outputs, a balanced modulator having a pair of inputs connected to the outputs of said phase inverter, a third input and an output connected to the input of said second resonance amplifier, and a generator for producing a periodic control wave having an output connected to the third input of said balanced modulator and coupling the second output of said frequency varying circuit means to the input of said second resonance amplifier;

a cathode ray oscilloscope having a horizontal deflection plate system for deflecting an electron beam therein horizontally and a vertical deflection plate system for deflecting said electron beam vertically;

summing means having first and second inputs and an output for adding signals supplied to its inputs and providing the resultant sum at its output;

first additional coupling means comprising a first resonance circuit coupled between said first resonance amplifier and said one of said deflection plate systems and a first voltage divider connected between said first resonance circuit and the first input of said summing means and coupling the output of said first resonance amplifier to one of the deflection plate systems of said oscilloscope and to the first input of said summing means; and second additional coupling means comprising a second resonance circuit coupled between said second resonance amplifier and said other of said deflection plate systems and a second voltage divider connected between said second resonance circuit and the second input of said summing means and coupling the output of said second resonance amplifier to the other of the deflection plate systems of said oscilloscope and to the second input of said summing means.

* * * * *